(12) United States Patent  
Siecke et al.

(10) Patent No.: US 7,051,873 B2  
(45) Date of Patent: May 30, 2006

(54) STORAGE CASE FOR INFORMATION CARRIER

(75) Inventors: Michael Alan Siecke, Glendale, CA (US); Rachel Heieck, Glendale, CA (US); Edgar F. Stark, Olyphant, PA (US); Francis L. Monahan, Olyphant, PA (US)

(73) Assignee: Time Warner Inc., New York, NY (US)

( * ) Notice: Subject to any disclaimer, the term of this patent is extended or adjusted under 35 U.S.C. 154(b) by 0 days.

(21) Appl. No.: 10/713,401

(22) Filed: Nov. 14, 2003

(65) Prior Publication Data

US 2005/0103657 A1    May 19, 2005

Related U.S. Application Data

(63) Continuation-in-part of application No. 29/190,629, filed on Sep. 24, 2003, now abandoned, and a continuation-in-part of application No. 29/193,146, filed on Nov. 4, 2003.

(51) Int. Cl.  
*B65D 85/57* (2006.01)

(52) U.S. Cl. .................................. 206/308.1; 206/309

(58) Field of Classification Search ............. 206/308.1, 206/309–313, 493  
See application file for complete search history.

(56) References Cited

U.S. PATENT DOCUMENTS

| | | | | |
|---|---|---|---|---|
| 4,627,531 A | * | 12/1986 | Clemens | 206/308.1 |
| 5,322,162 A | * | 6/1994 | Melk | 206/310 |
| 5,720,387 A | * | 2/1998 | Young | 206/308.1 |
| 5,906,274 A | | 5/1999 | McEwan | |
| 5,931,294 A | * | 8/1999 | Weingarden et al. | 206/308.1 |
| 6,056,117 A | * | 5/2000 | Courchesne | 206/308.1 |
| 6,302,176 B1 | * | 10/2001 | Chen | 206/308.1 |
| 6,450,332 B1 | * | 9/2002 | Courchesne | 206/308.1 |
| 6,698,586 B1 | * | 3/2004 | Sankey et al. | 206/308.1 |

* cited by examiner

*Primary Examiner*—Luan K. Bui  
(74) *Attorney, Agent, or Firm*—Amster, Rothstein & Ebenstein, LLP (57) ABSTRACT

A storage case for a center-mounted information carrier includes two hinged parts formed of plastic—namely, a base and a lid. The base free ends is a generally smooth, bilaterally symmetrical curve formed by an upstanding flange of substantial thickness, while the lid free end is a generally smooth, bilaterally symmetrical curve. The lid free end terminates short of the base free end so that the base free end can protect the lid free end. The storage case has a generally smooth exterior yet intuitively communicates to a potential first-time user how the case should be opened.

25 Claims, 6 Drawing Sheets

STORAGE CASE FOR INFORMATION CARRIER

CROSS-REFERENCE TO RELATED APPLICATION

This is a continuation-in-part of U.S. Design patent applications No. 29/190,629, filed Sep. 24, 2003 and No. 29/193,146, filed Nov. 4, 2003.

BACKGROUND OF THE INVENTION

The present invention relates to a storage case for a center-mounted informations carriers which is generally similar to the conventional jewel box, and in particular, to such a package which provides a generally smooth, more attractive exterior surface and is easier to open.

Conventional "jewel box" storage case for center-mounted information carriers (such as compact discs, ROM's, and the like), although ubiquitous, have not proven to be entirely satisfactory in use. A major complaint has been the difficulty in opening such a jewel box. Three of the four peripheral surfaces of the closed case define, intermediate the major top surface and the major bottom surface, a peripheral recess intended to enable finger grips for the lid and the base such that the case can be moved from the closed (folded) orientation to the open (unfolded) orientation by relative pivoting movement. Such peripheral recesses not only waste space, but frustrate efforts of the handicapped, arthritic, rheumatic, as well as the very old, very young or overweight for whom the recesses are essentially non-functional. One can ignore the space that is wasted by the jewel box design in order to provide such peripheral recesses (the wasted space being measured by the extent to which the lid and base extend outwardly beyond the recess) as the commonly accepted peripheral dimensions of the conventional jewel box have become more or less universal. However, the extended edges of the recess (formed by the periphery of the lid and the periphery of the base) have a tendency to get caught on various objects in the environment and, as these edges are typically relatively thin in cross-section, this may result in breakage thereof.

Perhaps the most disturbing aspect of the conventional jewel box is its failure to adequately communicate to a potential first-time user on an intuitive level precisely how the jewel box is to be opened.

Accordingly, an object of the present invention is to provide a storage case generally similar to a conventional jewel box, but which in a preferred embodiment intuitively communicates to a potential first-time user how the case is to be opened.

Another object is to provide such a case which in a preferred embodiment has a generally smooth exterior devoid of thin sharp edges which can catch on articles in the environment or simply break.

It is also an object of the present invention to provide such a case which is simple and economical to manufacture, use and maintain.

SUMMARY OF THE INVENTION

It has now been found that the above and related objects of the present invention are obtained in a storage case for a center-mounted information carrier. The storage case comprises two hinged parts formed of plastic and adapted to house a center-mounted information carrier. One of the hinged parts defines a base which includes a generally planar surface, a base hinged end and a base free end, and a pair of opposed upturned flanged base sidewalls. The base free end defines a generally smooth, bilaterally symmetrical curve formed by an upturned flange of substantial thickness, the planar surface defining at substantially the center thereof a spindle on which the carrier may be mounted. The other of the hinged parts defines a lid which includes a generally planar surface, a lid hinged end and a lid free end, and a pair of opposed downturned flanged lid sidewalls connecting the lid hinged and free ends. The lid free end defines a generally smooth, bilaterally symmetrical curve. The lid sidewalls extend over substantially the entire length of the base sidewalls, and the lid free end terminates short of the base free end so that the base free end can protect the lid free end.

The lid is pivotable about the axis of the hinge relative to the base between an open orientation exposing the carrier for removal and a closed orientation wherein the carrier is maintained within the storage case. The lid and base sidewalls define cooperating means on facing surfaces thereof for maintaining the storage case in the closed orientation against accidental movement toward the open orientation.

Preferably the lid and base free ends are frosted or otherwise not substantially transparent, while the planar surface of the lid and the portion of the planar surface of the base receiving the carrier are substantially transparent.

In a preferred embodiment the lid and base free ends define generally smooth, bilaterally symmetrical curves having an exposed central flat of about 10 mm to facilitate stacking and transport during the use of automated assembly equipment. The undersurface of the lid free end is chamfered upwardly and, when in the closed orientation, is supported by an upwardly-projecting boss of the base.

In another preferred embodiment, each of the lid sidewalls defines angled serrations on a central portion of an outer surface thereof substantially spaced from both the lid hinged end and the lid free end. The serrations define at the top thereof flats for the receipt of an adhesive label. The serrations are frosted, parallel and hatched in only one direction.

In a further preferred embodiment, all of the exposed outer surfaces of the storage case in a closed orientation are substantially flat, except for the exposed curved surface outer surface of the base free end, and devoid of finger grip indentations, thereby to minimize catching of the storage case. The exposed curved outer surface of the base free end is curved in one dimension but otherwise substantially flat and devoid of finger grip indentations. All of the exposed outer edges of the storage case defined by the planar surfaces and the sidewalls and by the planar surfaces and the free and hinged ends are rounded, and all of the exposed outer corners of the storage case defined by the sidewalls and the free ends and by the sidewalls and the hinged ends are rounded. A surface of the upturned flange of the base free end facing the base hinged end is curved to face, receive and protect the lid free end.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Referring now to the drawing, and in particular to FIGS. 1–11 thereof, therein illustrated is a storage case according to the present invention, generally designated by the reference numeral 10. FIGS. 1–5 illustrate the case 10 in an open or unfolded orientation, while FIGS. 6–11 illustrate the case 10 in a closed or folded orientation.

The case 10 of the present invention has many functional and structural features in common with the conventional "jewel box". Thus, both packages comprise two hinged parts formed of plastic and adapted to house a center-mounted information carrier (not shown) such as a CD, ROM, or the like. One of the hinged parts defines a base, generally designated 12, while the other of the hinged parts defines a lid, generally designated 14.

The base 12 includes a generally planar surface 20, a hinged end 22 and a free end 24, as well as a pair of opposed upturned flanged sidewalls 26. The planar surface 20 defines at substantially the center thereof a spindle 28 (illustrated in the form of a conventional jewel box rosette) on which the center-mounted information carrier may be mounted. The lid 14 includes a generally planar surface 30, a hinged end 32 and a free end 34, as well as a pair of opposed downturned flanged sidewalls 36 (the downturned flanged lid sidewalls 36 appearing upturned when the package is in the open orientation (as in FIGS. 1–5).

As best seen in the closed orientation (illustrated in FIGS. 6–11), the lid sidewalls 36 extend substantially over the entire length of the base sidewalls 26 (although not over the sidewalls of the base free end 24) and rest on outwardly projecting edges 29 of the base 12 to seal the case cavity containig the carrier.

The lid 14 and the base 12 are relatively pivotable about the common axis of the hinged ends 22, 32, between an open orientation exposing the carrier for removal (see FIGS. 1–5) and a closed orientation wherein the carrier is maintained within the storage case (see FIGS. 6–11). The outer surfaces of the base sidewalls 26 and the inner surfaces of the lid sidewalls 36 define cooperating means on such facing surfaces thereof for maintaining the storage case 10 in the closed orientation against accidental movement towards the open orientation. Preferably one set of sidewalls 26, 36 defines shallow recesses, while the other set of sidewalls 36, 26 defines shallow projections configured and dimensioned to be easily releasably received within the recesses.

A comparison of the storage case 10 and the conventional jewel box will reveal many other common features including raised portions 40 of the base about the planar surface 20 receiving the carrier, four finger grips depressions 42 disposed generally at the corners of the base 12 to facilitate removal of the carrier from the base (and in particular the base planar surface 20), and scuff rails 44 on the major outer surfaces of the lid and base.

Figure 1:
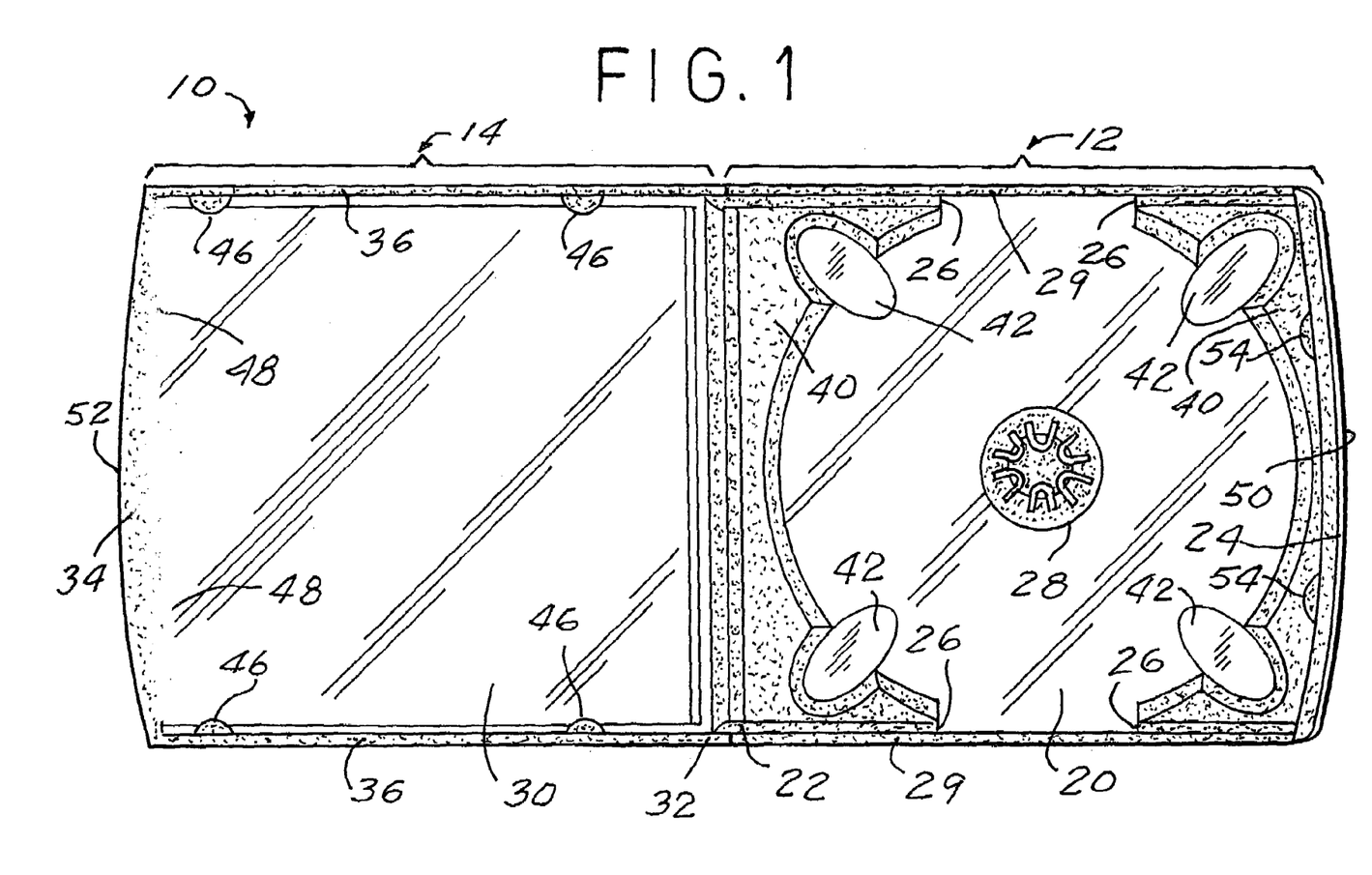
FIG. 1 is a top plan view of a first embodiment of a storage case according to the present invention, in an open orientation.
Figures 2, 3, 4:
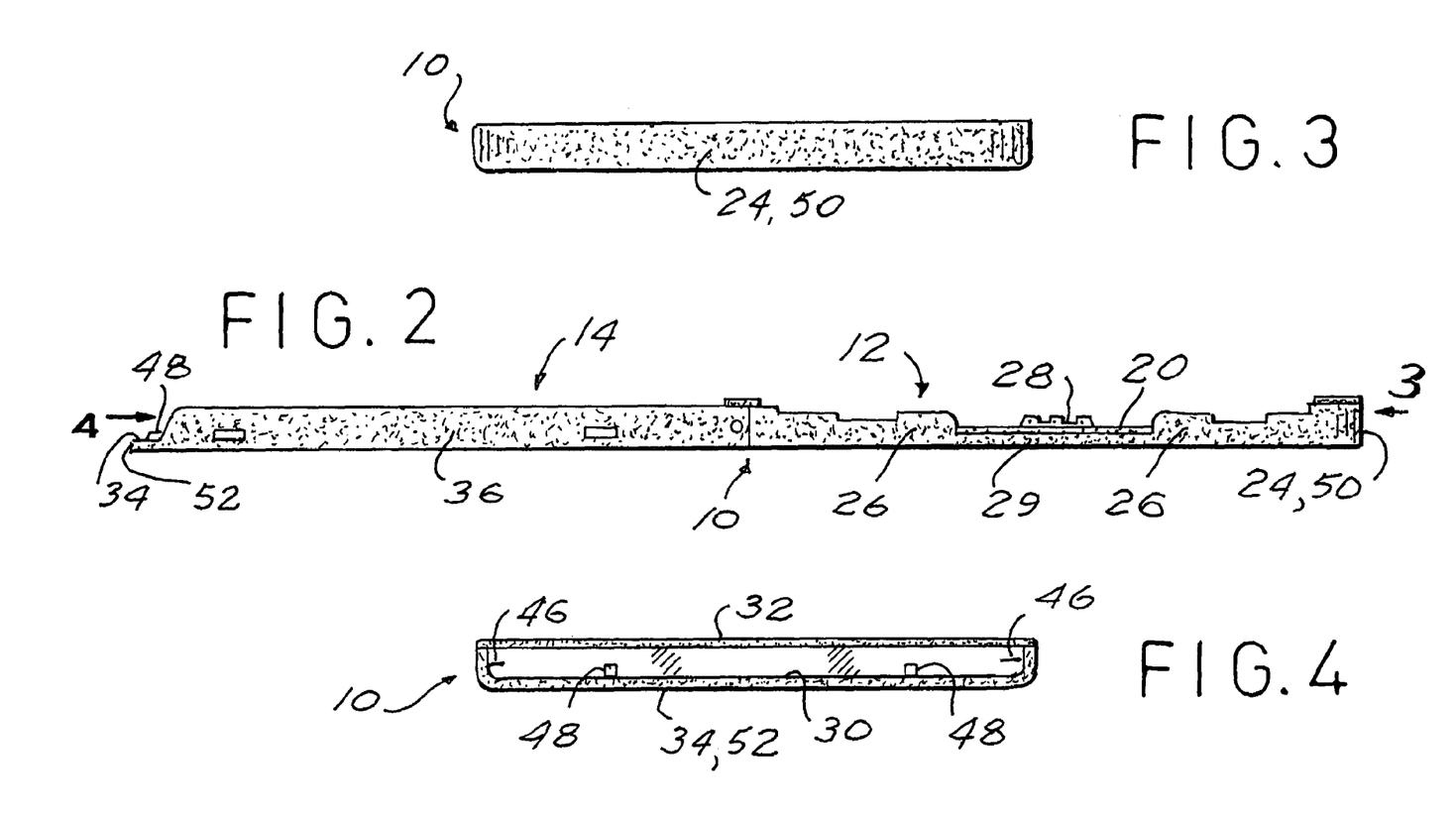
FIG. 2 is a side elevational view thereof, the view from the opposite side being a mirror image thereof.
FIG. 3 is an end elevational view thereof, taken in the direction of the arrow 3 of FIG. 2.
FIG. 4 is an end elevational view thereof, taken in the direction of the arrow 4 of FIG. 2.
Figure 5:
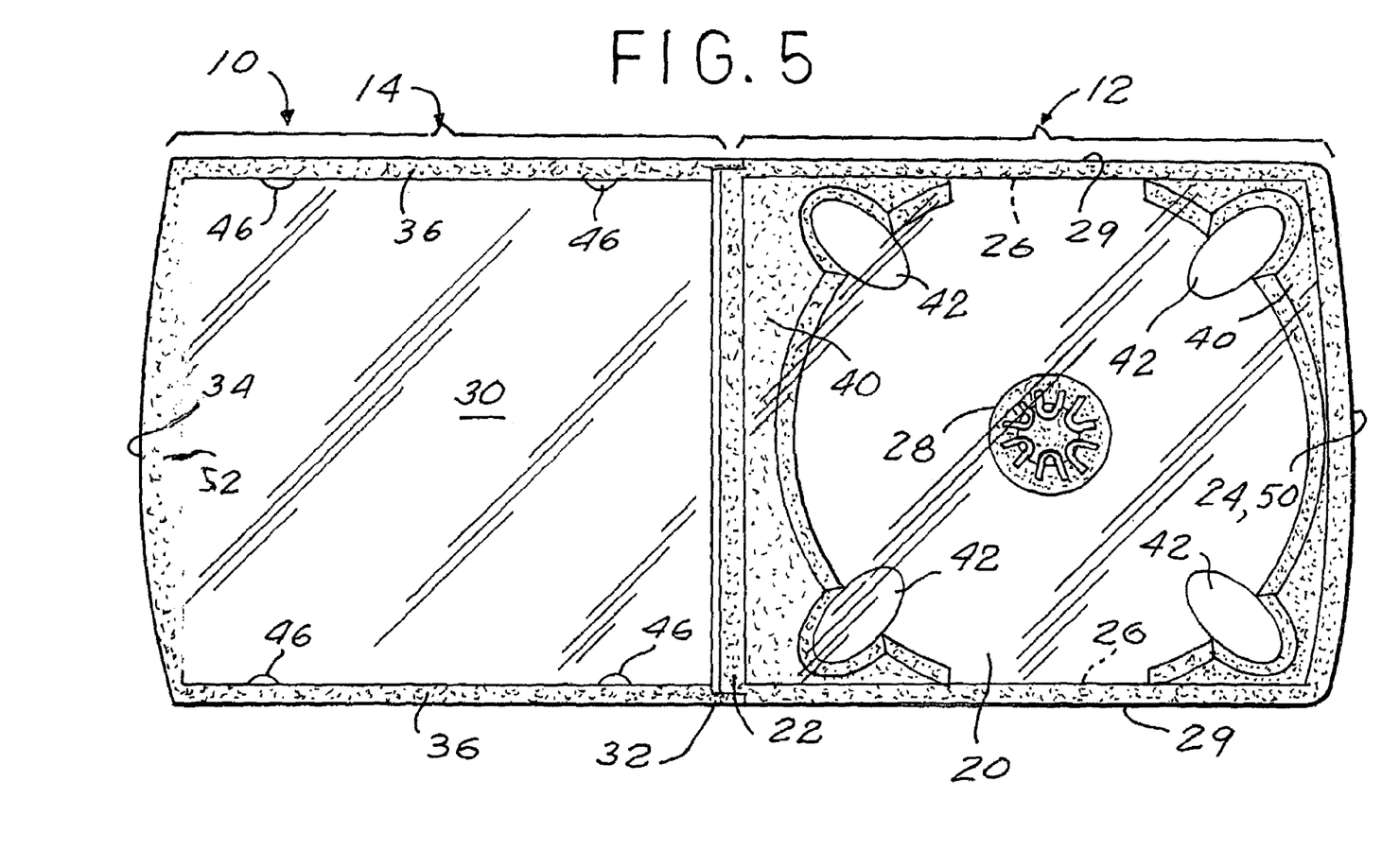
FIG. 5 is a bottom plan view thereof.
Figure 6:
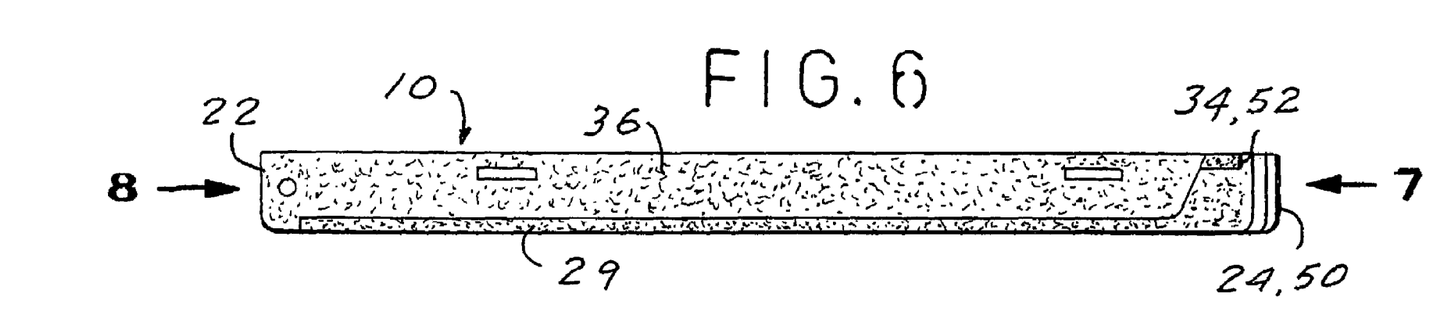
FIG. 6 is a side elevational view thereof in a closed orientation and to an enlarged scale, the view from the opposite side being a mirror image thereof.
Figure 7:
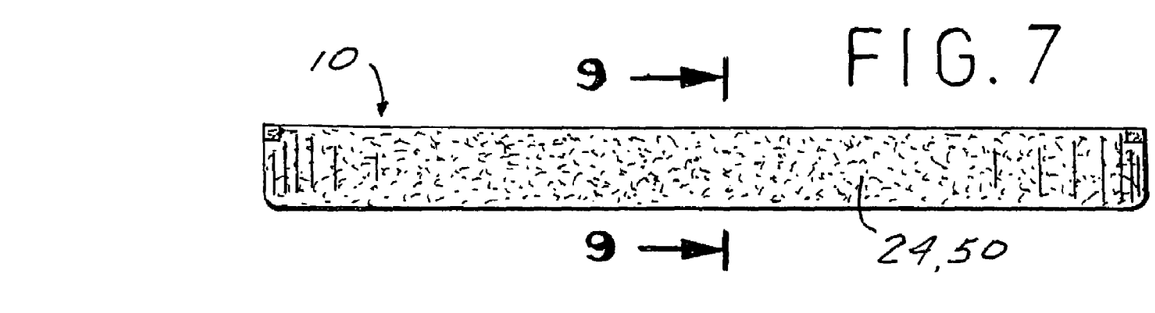
FIG. 7 is a front end elevational view thereof, taken in the direction of arrow 7 of FIG. 6.
Figure 8:
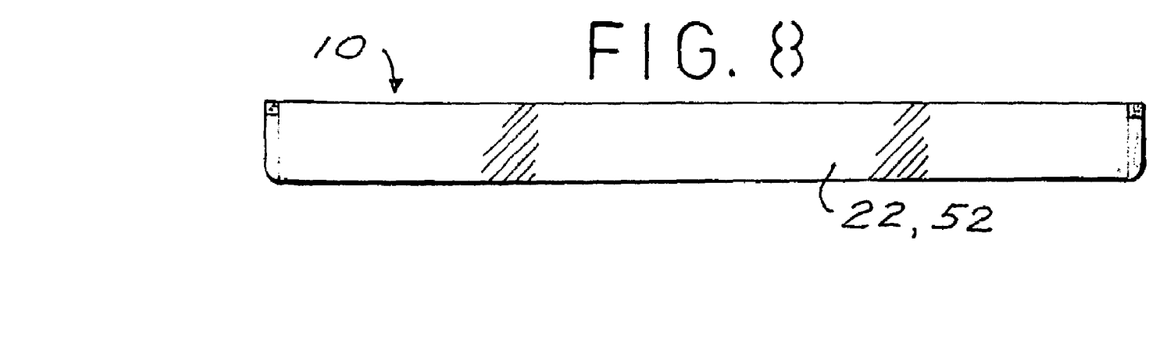
FIG. 8 is a rear end elevational view thereof, taken in the direction of arrow 8 of FIG. 6.
Figure 9:
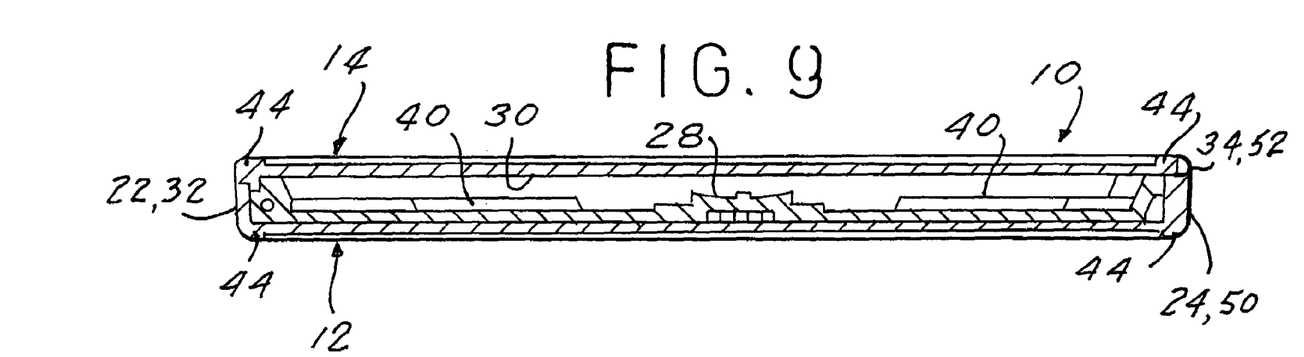
FIG. 9 is a sectional view thereof, taken along the line 9—9 of FIG. 7.
Figure 10:
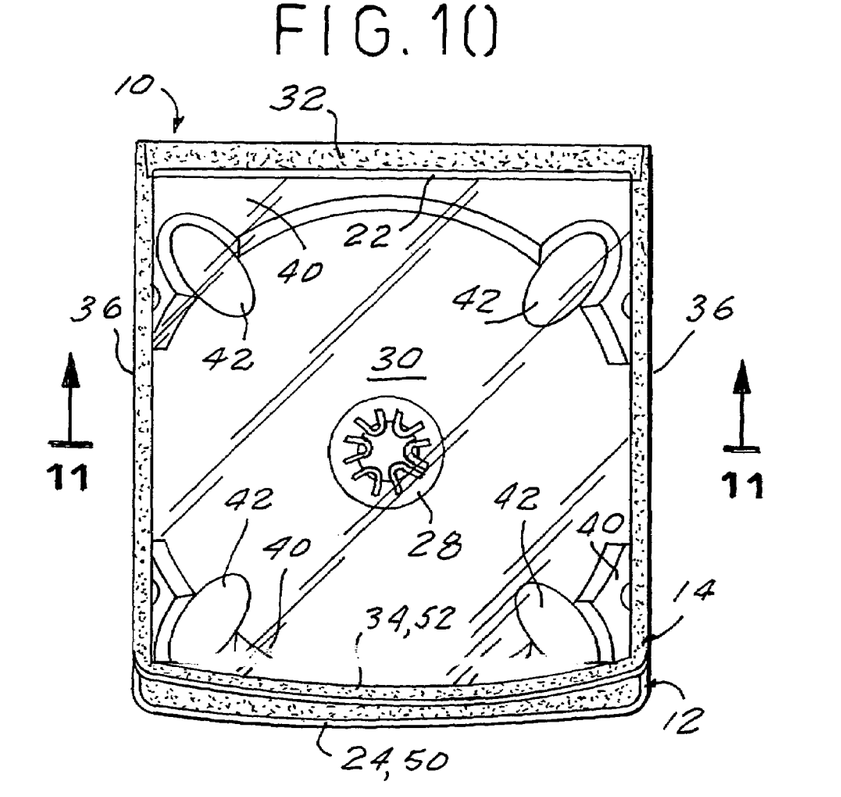
FIG. 10 is a top plan view thereof.
Figure 11:
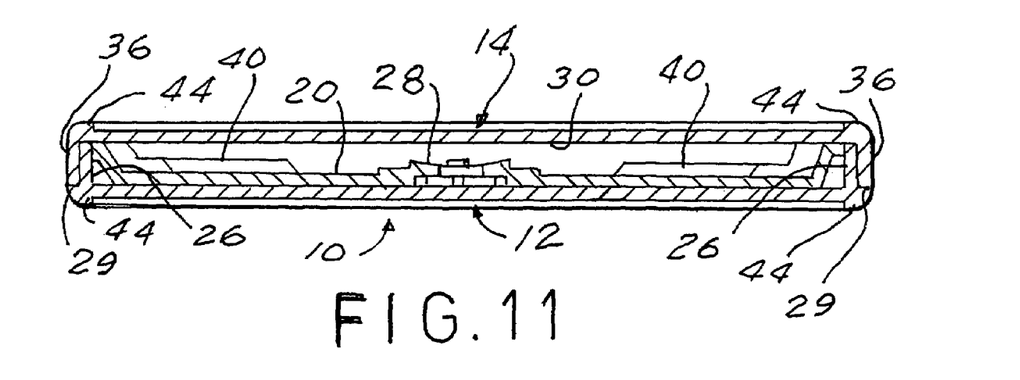
FIG. 11 is a sectional view thereof, taken along the line 11—11 of FIG. 10.

Each lid sidewall 36 defines a pair of chamfered booklet detention tabs or flaps 46 which are spaced below the lid planar surface 30 (above the lid planar surface 30 when viewed in an open orientation as in FIG. 1) so that a booklet, graphics or other promotional matter (not shown) may be inserted past the lid free end 34 and maintained against the lid planar surface 30 by the four flaps 46 such that at least a portion of the booklet is viewable through the transparent lid planar surface 30. A spaced pair of detents 48 projecting downwardly from the lid free end 34 (projecting upwardly in the open orientation illustrated in FIG. 1) cooperates with the flaps 46 and the lid hinged end 32 to maintain proper positioning of the booklet such that the booklet may be pivoted with the lid 14 about the hinge axis.

Turning now to the novel features of the present invention which provide for a generally smooth exterior yet intuitively communicate to a potential first-time user how the case 10 should be opened, the base free end 24 defines a generally smooth, bilaterally symmetrical curve 50 formed by an upturned flanged of substantial thickness extending towards the base planar surface 20. The lid free end 34 defines a generally smooth, bilaterally symmetrical curve 52 extending towards the base free end 24 in the closed orientation. The lid free end 34 terminates just short of the base free end 24 so that the base free end 24 can protect the lid free end 34. More specifically, each of the base and lid free ends 24, 34 defines a generally smooth, bilaterally symmetrical curve 50. 52 having an exposed central flat in order to facilitate stacking and transport of the storage cases 10 during the use of automated assembly equipment.

In point of fact, what appears to be a "generally smooth" curve is constructed of three flats, two outer flats joined at an angle of about 3 (±1) degrees to a central flat. Both the outer ends of the outer flats and the intersections of the outer ends of the central flat with the inner ends of the outer flats are smoothed into curves of long radii to provide the generally smooth appearance. By way of example only, the lid 12 may have flats of 40-10-40 mm in length while the base 14 may have flats of 35-30-35 mm in length, with the middle figure in each instance being the length of the central flat.

The thickness of the base free end 24 facilitates the user immobilizing the base 12 by applying fingertip pressure directly atop the base free end 24. The base free end 24 may be immobilized by grasping either the central portion of the base free end 24 or the relatively thicker lateral surfaces of the base free end 24. Simultaneously, the fingers of the user may grasp the two lid sidewalls 36 to lift the lid 14 relative to the base 12 and thereby move the storage case from its closed orientation to its open orientation. This intuitive procedure for opening the storage case 10 is further conveyed by the base and lid free ends 24, 34 being of a contrasting appearance (preferably due to frosting or a contrasting color) relative to the lid planar surface 30 and the portion of the base planar surface 20 receiving the carrier, these being substantially transparent, unfrosted, or of contrasting color. The storage case 10 is accessible not only to those of good health, but also the handicapped, arthritic, rheumatic, the very old, the very young and the overweight since there is no need for a delicate insertion of fingertips into a small shallow recess cooperatively defined by edges extending from the base and lid free ends.

The storage case 10 presents a more attractive appearance to users since, in the closed orientation, all the exposed outer surfaces of the storage case are preferably substantially flat, except for the exposed curved outer surface of the base free end 24, and devoid of finger grip indentations, thereby also minimizing catching of the storage case on articles in the environment. Indeed, the exposed outer surface of the base free end is preferably curved in one dimension, but otherwise substantially flat and devoid finger grip indentations. All of the exposed outer edges of the storage case defined by intersection of the planar surfaces 20, 30 and the sidewalls 26, 36, and by intersection of the planar surfaces 20, 30 and the free and hinged ends 24, 34 and 22, 32 are preferably rounded. Similarly, all of the exposed outer corners of the storage case defined by intersection of the sidewalls 26, 36 and the free and hinged ends 24, 34, and 22, 32 are preferably rounded.

Despite the many common features of the storage case 10 of the present invention and a conventional jewel case, the closed storage case 10 presents a more attractive, inviting appearance due to the absence of finger indentations and the use of rounded exposed outer corners and edges and the substantially smoothly curved outer surface of the base free end 24. The lid free end 34 is preferably chamfered so that its thickness decreases towards the outer edge of the free end 34. Moreover, the surface of the upturned flange of the base free end 24 facing the base hinged end 22 is curved to face, receive and protect the lid free end 34 with which it is flush in the closed orientation. The undersurface of the lid free end 34 is preferably chamfered or beveled upwardly and, in the closed orientation of the case 10, is supported by at least one upwardly-projecting boss 54 on the base (and, as illustrated, preferably two bosses 54), thereby to promote its receipt and protection by the facing base free end 24.

Figures 12, 13, 14:
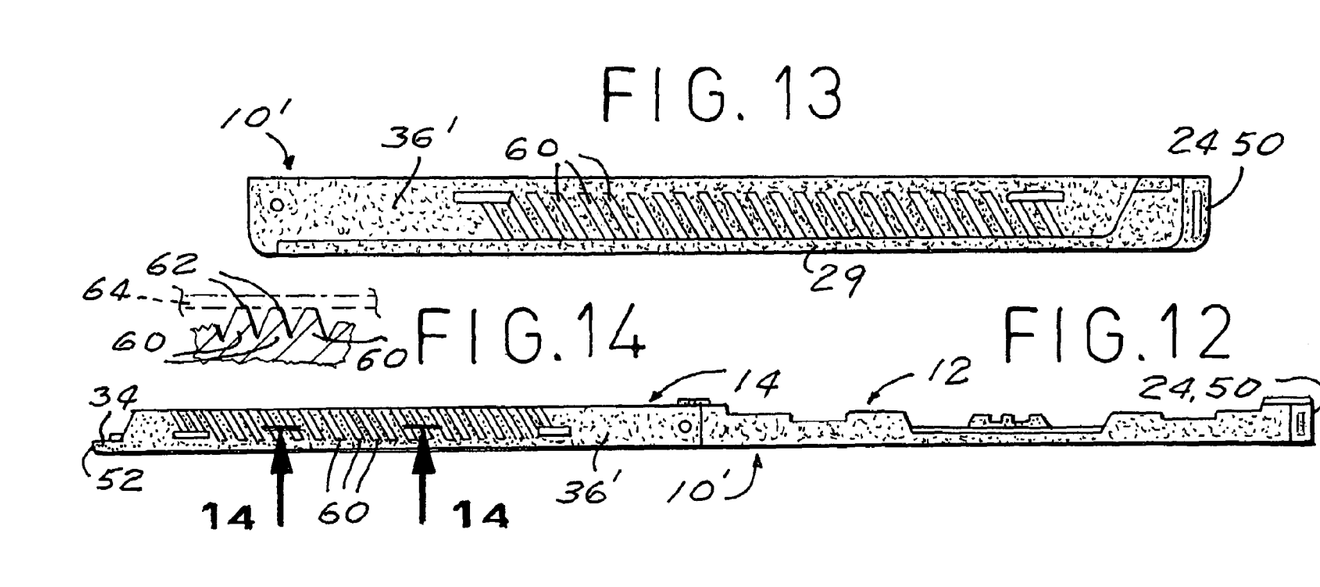
FIGS. 12 and 13 are views similar to FIGS. 2 and 6, respectively, but of a second embodiment, all other views of the second embodiment being the same as the other views of the first embodiment.
FIG. 14 is a fragmentary sectional view thereof, to a greatly enlarged scale, taken along the line 14—14 of FIG. 12.

Referring now to FIGS. 12–14 in particular, therein illustrated is a second embodiment of the present invention, generally designated 10'. The second embodiment 10' is identical to the first embodiment 10 except that, whereas the lid sidewalls 36 of the first embodiment 10 are illustrated as being devoid of serrations on the outer surface thereof, the lid sidewalls 36' of the second embodiment 10' bear on the outer surface thereof serrations 60. The serrations 60 are disposed only on a central portion of the outer surface of each sidewall 36' substantially spaced from both the lid hinged end 32 and the lid free end 34. More particularly, the serrations 60 do not extend beyond the slots in the outer sidewall corresponding to the booklet flaps 46. Typically this leaves about an outer ⅓ of the length of the lid sidewall 36' without serrations. Accordingly, the serrations 60 do not weaken the lid sidewalls 36 as would be the case if they extended the whole length thereof, including the lid hinged and free ends 32, 34.

While the serration 60 may extend perpendicular to the lid planar surface 30, they are preferably angled (at other than a right angle) to the lid planar surface 30. More particularly, they are preferably parallel and hatched in only one direction, although for particular applications the serrations may consist of two sets of parallel angled serrations which are intersecting so that the serrations are cross-hatched (that is, hatched in two directions). The serrations 60 facilitate gripping of the lid sidewalls 36 both manually, as required during the opening of the storage case 10' by a user, and mechanically, as required by the automated assembly equipment used during assembly of the storage case (with the carrier). The ability of the storage case 10' to be grasped on the lid sidewalls 36' by the automated assembly equipment in an efficient and reliable manner facilitates transport thereof through the automated assembly equipment.

As best illustrated in FIG. 14, the serrations 60 are preferably in the form of a truncated inverted "V" so that the serrations define flat 62 at the truncated tops thereof (that is, the outer surface thereof). The flats 62 facilitate placement of an adhesive label 64 (illustrated in phantom line in FIG. 14) on the lid sidewall outer surface, whether by the storage case manufacturer or by the wholesalers/retailers so as to convey additional information to the potential purchaser.

In order to promote intuitive recognition by a user of the preferred method of opening the storage case 10', the serrations 60 are preferably frosted, at least on the truncated flats 62 thereof. In this manner the user's attention is directed to the lid sidewalls 36' (which are to be held by the fingers of one hand to move the lid). The frosting on the base free end 24 and the lid free end 34 draw the attention of the user to the place where the other hand should hold the base 12 in order to stabilize (immobilize) the same during the opening process. It will be appreciated that typically the opaque booklet (not shown) adjacent the lid planar surface 30 will be masking from the user's view any other frosted portion of the base 12 adjacent the bsae free end 24 during the opening process.

It will be appreciated by those skilled in the jewel box art that what has been described herein as the base 12 is in reality a two component element, just as it is in the conventional jewel box. One component is simply a casing defining a planar inner surface, an unfrosted upstanding end wall which forms the spine of the closed storage case adjacent the hinged ends 22, 32, and a frosted flanged upstanding end wall forming the outer surface of the base free end 24. On each side a partially interrupted sidewall extends between the hinged and free ends of the casing. The other component is a tray configured and dimensioned to snap into the casing, with one raised and flat end flange extending over the casing end wall at hinged end 22 and the other raised and curved end flange abutting (but preferably not overlapping) the casing end wall at free end 24. The curved end flange of the tray which abuts the casing end wall (which forms the outer surface of the base free end 24) is based on three flats having a ratio of about 37-20-37 appropriately smoothed as described hereinbefore in connection with the base and lid free ends 24, 34. These tray flanges are preferably chamfered to facilitate receipt and engagement of the tray by the casing. The facing sidewalls of the casing and the tray cooperatively form means for retaining (preferably releasably retaining) the tray within the casing. It is, of course, the tray which defines the raised portions 40, the finger grips 42, the spindle 48, the bosses 54, etc. During ordinary use of the storage case 10, 10', the casing and the tray act both structurally and functionally as a unit.

It is noted, however, that a paper or paperboard insert (not shown) may extend intermediate the bottom of the tray and the top of the casing with an end flange thereof being turned up and extending parallel to the hinged end of the casing. The insert is preferably printed on both sides thereof so that portions thereof are visible through the transparent planar surface of the outer casing (that is, from the back of the closed storage case), through the transparent planar surface of the tray (so that it is visible to a user from the front once the carrier is removed from the base), and through the transparent hinged end of the casing (so that any identifying data thereon may be visible through the spine of the storage case in the closed orientation).

The use of such a two component base 12 and an insert as part thereof is conventional in the art and hence need not be described herein in further detail or illustrated in the drawing.

To summarize, the present invention provides a storage case generally similar to a conventional jewel box, but which intuitively communicates to a potential first-time user how the case is to be opened. The case has a generally smooth exterior devoid of thin sharp edges that can catch on articles in the environment or simply break. The case is simple and economical to manufacture, use and maintain.

Now that the preferred embodiments of the present invention have been shown and described in detail, various modifications and improvements thereon will become readily apparent to those skilled in the art. Accordingly, the spirit and the scope of the present invention is to be construed broadly and limited only by the appended claims, and not by the foregoing specification.

We claim:

1. A storage case for a base-mounted information carrier, the storage case comprising:
    two hinged parts formed of plastic and adapted to house a base-mounted information carrier,
    (A) one of the hinged parts defining a base which includes a generally planar surface, a base hinged end and a base free end, and a pair of opposed upturned flanged base sidewalls, the base free end defining a generally smooth, bilaterally symmetrical curve formed by an upturned flange of substantial thickness, the planar surface defining a spindle on which the carrier may be mounted, and
    (B) the other of the hinged parts defining a lid which includes a generally planar surface, a lid hinged end and a lid free end, and a pair of opposed downturned flanged lid sidewalls connecting the lid hinged and free ends, the lid free end defining a generally smooth, bilaterally symmetrical curve;
        the case defining a closed orientation with the lid sidewalls extending over substantially the entire length of the base sidewalls, and the curve of the lid free end terminating short of and in the same plane as the curve of the base free end so that the base free end can protect the lid free end without contacting or engaging the lid free end.

2. The storage case of claim 1 wherein the lid and base free ends are frosted.

3. The storage case of claim 2 wherein the planar surface of the lid and the portion of the planar surface of the base receiving the carrier are substantially transparent.

4. The storage case of claim 1 wherein the lid and base free ends define generally smooth, bilaterally symmetrical curves having an exposed central flat of about 10 mm to facilitate stacking and transport during the use of automated assembly equipment.

5. The storage case of claim 1 wherein the lid is pivotable about the axis of the hinge relative to the base between an open orientation exposing the carrier for removal and a closed orientation wherein the carrier is maintained within the storage case, the lid and base sidewalls defining cooperating means on facing surfaces thereof for maintaining the storage case in the closed orientation against accidental movement toward the open orientation.

6. The storage case of claim 1 wherein each of the lid sidewalls defines angled serrations on a central portion of an outer surface thereof substantially spaced from both the lid hinged end and the lid free end.

7. The storage case of claim 6 wherein the serrations define at the top thereof flats for the receipt of an adhesive label.

8. The storage case of claim 6 wherein the serrations are frosted.

9. The storage case of claim 6 wherein the serrations are parallel and hatched in only one direction.

10. The storage case of claim 1 wherein an undersurface of the lid free end is chamfered upwardly and when said case is in the closed orientation, is supported by an upwardly projecting surface of said base.

11. The storage case of claim 1 wherein all of the exposed outer surfaces of the storage case in a closed orientation are substantially flat, except for the exposed curved outer surface of the base free end, and devoid of finger grip indentations, thereby to minimize catching of the storage case.

12. The storage case of claim 11 wherein the exposed curved outer surface of the base free end is curved in one dimension but otherwise substantially flat and devoid of finger grip indentations.

13. The storage case of claim 11 wherein all of the exposed outer edges of the storage case defined by the planar surfaces and the sidewalls and by the planar surfaces and the free and hinged ends are rounded.

14. The storage case of claim 11 wherein all of the exposed outer corners of the storage case defined by the sidewalls and the free ends and by the sidewalls and the hinged ends are rounded.

15. The storage case of claim 1 wherein a surface of the upturned flange of the base free end facing the base hinged end is curved to face, receive and protect the lid free end.

16. The storage case of claim 1 wherein the lid and base free ends are other than substantially transparent, and the planar surface of the lid and the portion of the planar surface of the base receiving the carrier are substantially transparent.

17. The storage case of claim 1 wherein the base planar surface defines at substantially the center thereof the spindle, whereby the information carrier is substantially center-mounted.

18. The storage case of claim 1 wherein the base planar surface defines at substantially the center thereof the spindle, whereby the information carrier is substantially center-mounted.

19. A storage case for a generally center-mounted information carrier, the storage case comprising:
    (A) a base formed of plastic which includes a generally planar surface, a base hinged end and a base free end, and a pair of opposed upturned flanged base sidewalls, the base free end defining a generally smooth, bilaterally symmetrical curve formed by an upturned flange of substantial thickness, the planar surface defining at generally the center thereof a spindle on which the carrier may be mounted, and
    (B) a lid formed of plastic which includes a generally planar surface, a lid hinged end and a chamfered lid free end, and a pair of opposed downturned flanged lid sidewalls connecting the lid hinged and free ends, the lid free end defining a generally smooth, bilaterally symmetrical curve;

the lid and base being hinged together at the hinged ends;

the case defining a closed orientation with the lid sidewalls extending over substantially the entire length of the base sidewalls, and the curve of the lid free end terminating short of and in the same plane as the curve of the base free end, and a surface of the upturned flange of the base facing the base hinged end being curved to face, receive and protect the lid free end without contacting or engaging the lid free end.

20. The storage case of claim 19 wherein the lid and base free ends are other than substantially transparent, and the planar surface of the lid and the portion of the planar surface of the base receiving the carrier are substantially transparent.

21. The storage case of claim 19 wherein each of the lid sidewalls defines angled serrations on a central portion of an outer surface thereof substantially spaced from both the lid hinged end and the lid free end, the serrations defining at the top thereof flats for the receipt of an adhesive label.

22. The storage case of claim 19 wherein all of the exposed outer surfaces of the storage case in a closed orientation are substantially flat, except for the exposed curved surface outer surface of the base free end, and devoid of finger grip indentations, thereby to minimize catching of the storage case;

the exposed curved outer surface of the base free end being curved in one dimension but otherwise substantially flat and devoid of finger grip indentations;

all of the exposed outer edges of the storage case defined by the planar surfaces and the sidewalls and by the planar surfaces and the free and hinged ends being rounded, and all of the exposed outer corners of the storage case defined by the sidewalls and the free ends and by the sidewalls and the hinged ends being rounded.

23. The storage case of claim 19 wherein each of the generally smooth, bilaterally symmetrical curves having an exposed central flat of about 10 mm to facilitate stacking and transport during the use of automated assembly equipment.

24. The storage case of claim 19 wherein the base planar surface defines at substantially the center thereof the spindle, whereby the information carrier is substantially center-mounted.

25. A storage case for a center-mounted information carrier, the storage case comprising:

two hinged parts formed of plastic and adapted to house a center-mounted information carrier, (A) one of the hinged parts defining a base which includes a generally planar surface, a base hinged end and a base free end, and a pair of opposed upturned flanged base sidewalls, the base free end defining a generally smooth, bilaterally symmetrical curve formed by an upturned flange of substantial thickness, the planar surface defining at substantially the center thereof a spindle on which the carrier may be mounted, and (B) the other of the hinged parts defining a lid which includes a generally planar surface, a lid hinged end and a chamfered lid free end, and a pair of opposed downturned flanged lid sidewalls connecting the lid hinged and free ends, the lid free end defining a generally smooth, bilaterally symmetrical curve;

the lid sidewalls extending over substantially the entire length of the base sidewalls, the lid free end terminating short of the base free end, and a surface of the upturned flange of the base facing the base hinged end being curved to face, receive and protect the lid free end;

each of the generally smooth, bilaterally symmetrical curves having an exposed central flat of about 10 mm to facilitate stacking and transport during the use of automated assembly equipment;

the lid and base free end being other than substantially transparent, and the planar surface of the lid and the portion of the planar surface of the base receiving the carrier being substantially transparent;

each of the lid sidewalls defining serrations on a central portion of an outer surface thereof substantially spaced from both the lid hinged end and the lid free end, the serrations defining at the top thereof flats for the receipt of an adhesive label;

all of the exposed outer surfaces of the storage case in a closed orientation being substantially flat, except for the exposed curved surface outer surface of the base free end, and devoid of finger grip indentations, thereby to minimize catching of the storage case, the exposed curved outer surface of the base free end being curved in one dimension but otherwise substantially flat and devoid of finger grip indentations, and all of the exposed outer edges of the storage case defined by the planar surfaces and the sidewalls and by the planar surfaces and the free and hinged ends being rounded, and all of the exposed outer corners of the storage case defined by the sidewalls and the free ends and by the sidewalls and the hinged ends being rounded.

* * * * *